United States Patent
Mota et al.

(10) Patent No.: US 10,931,692 B1
(45) Date of Patent: Feb. 23, 2021

(54) FILTERING MECHANISM TO REDUCE FALSE POSITIVES OF ML-BASED ANOMALY DETECTORS AND CLASSIFIERS

(71) Applicant: Cisco Technology, Inc., San Jose, CA (US)

(72) Inventors: Javier Cruz Mota, Assens (CH); Jean-Philippe Vasseur, Anchorage, AK (US); Grégory Mermoud, Veyras (CH); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 518 days.

(21) Appl. No.: 15/001,806

(22) Filed: Jan. 20, 2016

Related U.S. Application Data

(60) Provisional application No. 62/167,369, filed on May 28, 2015, provisional application No. 62/106,434, filed on Jan. 22, 2015.

(51) Int. Cl.
| | | |
|---|---|---|
| *G06F 11/00* | (2006.01) | |
| *H04L 29/06* | (2006.01) | |
| *G06N 20/00* | (2019.01) | |

(52) U.S. Cl.
CPC ......... *H04L 63/1425* (2013.01); *G06N 20/00* (2019.01); *H04L 63/1458* (2013.01); *H04L 2463/144* (2013.01)

(58) Field of Classification Search
CPC ............. H04L 63/1425; H04L 63/1458; H04L 2463/144; G06N 99/005
See application file for complete search history.

(56) References Cited

U.S. PATENT DOCUMENTS

| | | | |
|---|---|---|---|
| 7,310,590 B1 | 12/2007 | Bansal | |
| 8,151,341 B1* | 4/2012 | Gudov | H04L 63/1408 726/13 |
| 8,272,044 B2 | 9/2012 | Ansari et al. | |
| 8,458,462 B1* | 6/2013 | Hanna | H04L 63/10 713/156 |
| 8,713,190 B1 | 4/2014 | Goodall et al. | |
| 8,839,417 B1* | 9/2014 | Jordan | H04L 63/0227 709/223 |

(Continued)

OTHER PUBLICATIONS

Ahmed, et al. "Machine Learning Approaches to Network Anomaly Detection" USENIX 2007, 14 pages.

(Continued)

*Primary Examiner* — Fatoumata Traore
*Assistant Examiner* — Carlton Johnson
(74) *Attorney, Agent, or Firm* — Behmke Innovation Group LLC; Kenneth J. Heywood; Jonathon P. Western

(57) ABSTRACT

In one embodiment, a device in a network receives information regarding a network anomaly detected by an anomaly detector deployed in the network. The device identifies the detected network anomaly as a false positive based on the information regarding the network anomaly. The device generates an output filter for the anomaly detector, in response to identifying the detected network anomaly as a false positive. The output filter is configured to filter an output of the anomaly detector associated with the false positive. The device causes the generated output filter to be installed at the anomaly detector.

17 Claims, 11 Drawing Sheets

(56) References Cited

U.S. PATENT DOCUMENTS

| | | | |
|---|---|---|---|
| 2004/0167964 A1* | 8/2004 | Rounthwaite | G06Q 10/107 709/206 |
| 2007/0226802 A1* | 9/2007 | Gopalan | G06F 21/564 726/24 |
| 2011/0004935 A1* | 1/2011 | Moffie | G06F 21/53 726/23 |
| 2011/0093785 A1* | 4/2011 | Lee | H04L 41/22 715/736 |
| 2012/0174222 A1* | 7/2012 | Peng | H04L 63/1416 726/23 |
| 2012/0198277 A1* | 8/2012 | Busser | H04L 63/1416 714/26 |
| 2014/0090053 A1* | 3/2014 | Simske | H04L 63/105 726/22 |
| 2015/0193695 A1 | 7/2015 | Cruz Mota et al. | |
| 2015/0193696 A1 | 7/2015 | Vasseur et al. | |
| 2015/0324582 A1 | 11/2015 | Vasseur et al. | |
| 2015/0326450 A1 | 11/2015 | Cruz Mota et al. | |
| 2015/0326609 A1 | 11/2015 | Cruz Mota et al. | |
| 2015/0334123 A1 | 11/2015 | Di Pietro et al. | |
| 2016/0028750 A1 | 1/2016 | Di Pietro et al. | |
| 2016/0028753 A1 | 1/2016 | Di Pietro et al. | |
| 2016/0028763 A1 | 1/2016 | Cruz Mota et al. | |

OTHER PUBLICATIONS

Cretu-Ciocarlie, et al., "Adaptive Anomaly Detection via Self-Calibration and Dynamic Updating", Recent Advances in Intrusion Detection, Jan. 2009, 20 pages, Springer Berlin Heidelberg.

Fiore, et al. "Network Anomaly Detection with the Restricted Boltzmann Machine." Neurocomputing 122, Jun. 2013, pp. 13-23, Elsevier.

Garcia-Teodoro, et al. "Anomaly-Based Network Intrusion Detection: Techniques, Systems and Challenges", Computers & Security 28, Aug. 2009, pp. 18-28, Elsevier.

Garg, et al. "Accurate Anomaly Detection Using Adaptive Monitoring and Fast Switching in SDN" I.J. Information Technology and Computer Science, Oct. 2015, pp. 34-42, MOdern Education and Computer Science Press.

Hajji, et al. "Statistical Analysis of Network Traffic for Adaptive Faults Detection" IEEE Transactions on Neural Networks, vol. 16, No. 5, Sep. 2005, pp. 1053-1063, IEEE Computational Intelligence Society.

Kind, et al., "Histogram-Based Traffic Anomaly Detection", IEEE Transactions on Network Service Management, vol. 6, No. 2, Jun. 2009, 13 pages.

Sajassi, et al., "BGP MPLS Based Ethernet VPN", Network Working Group, Internet Draft, <draft-ietf-l2vpn-evpn>, Oct. 2014, 52 pages, Internet Engineering Task Force Trust.

Simons, A., "Microsoft Advanced Threat Analytics Public Preview Release is Now Available", Online Blog: http://blogs,technet.com/b/ad/archive/2015/05/04/microsoft-advanced-threat-analytics-publi . . . , May 2015, 6 pages, Internet article.

Soule, et al., "Combining Filtering and Statistical Methods for Anomaly Detection", Proceeding IMC '05, Proceedings of the 5th ACM Sigcomm Conference on Internet Measurement, pp. 331-344, USENIX Assoc., Berkeley, CA, USA.

Tartakovsky, et al. "A novel approach to detection of intrusions in computer networks via adaptive sequential and batchsequential changepoint detection methods." Signal Processing, IEEE Transactions on 54.9 (2006): 33723382.

Venkatesh, et al., "HTTP Botnet Detection Using Adaptive Learning Rate Multilayer Feed-Forward Neural Network", WISTP Proceedings of the 6th IFIP WG 11.2 Conference on Information Security Theory and Practice: Security, Privacy and Trust in Computing Systems and Ambient Intelligent Ecosystems, Jun. 2012, pp. 38-48, Springer Berlin Heidelberg.

Zhang, Y, "An Adaptive Flow Counting Method for Anomaly Detection in SDN", CoNEXT '13 Proceedings of the ninth ACM Conference on Emerging Networking Experiments and Technologies, Dec. 2013, pp. 25-30, ACM, New York, NY.

* cited by examiner

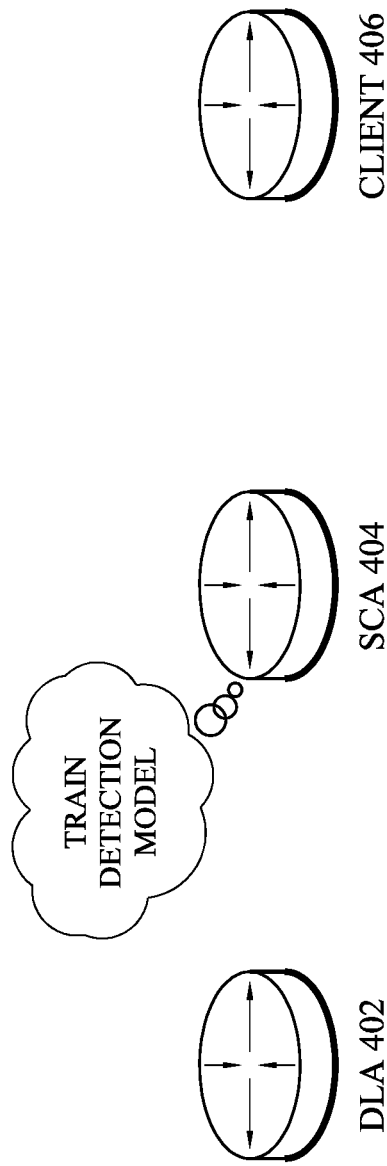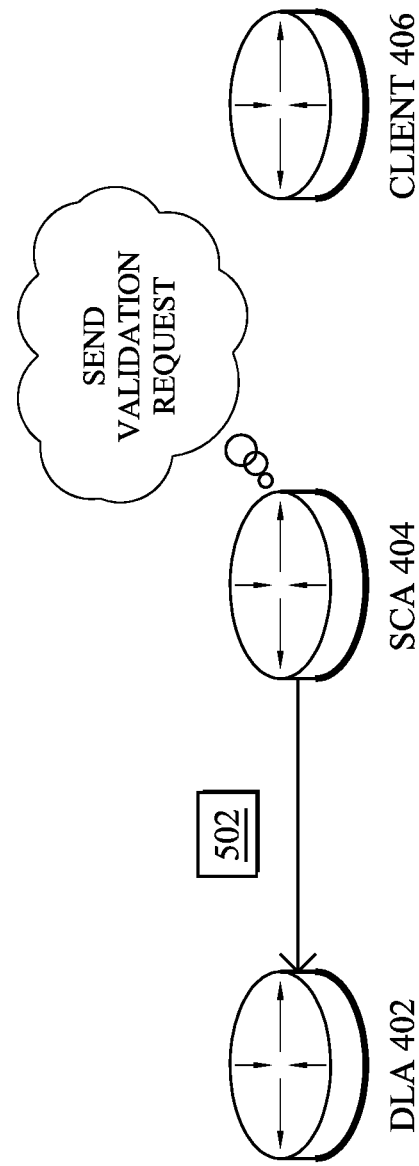

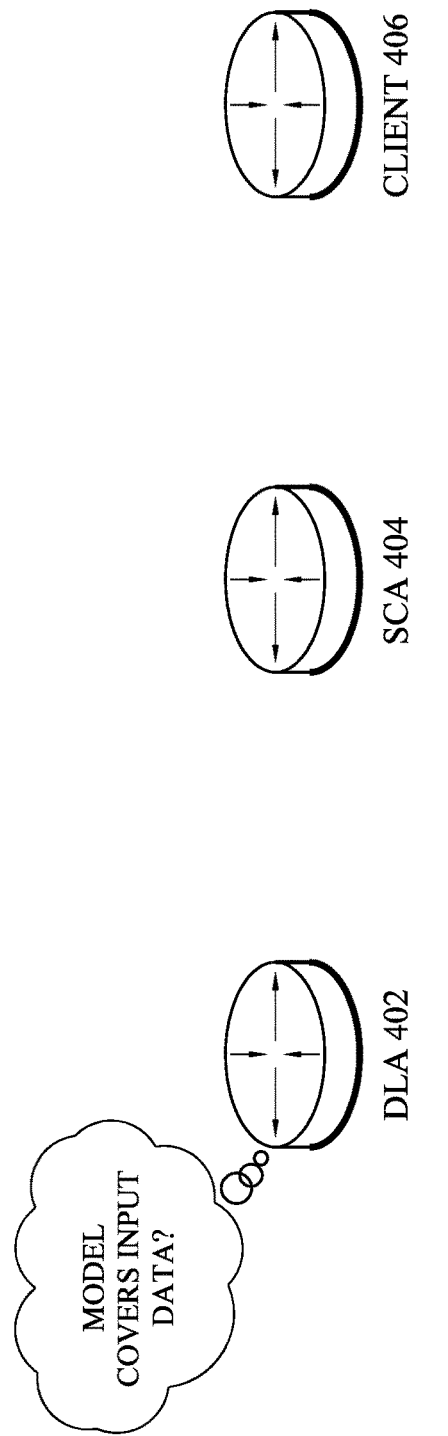
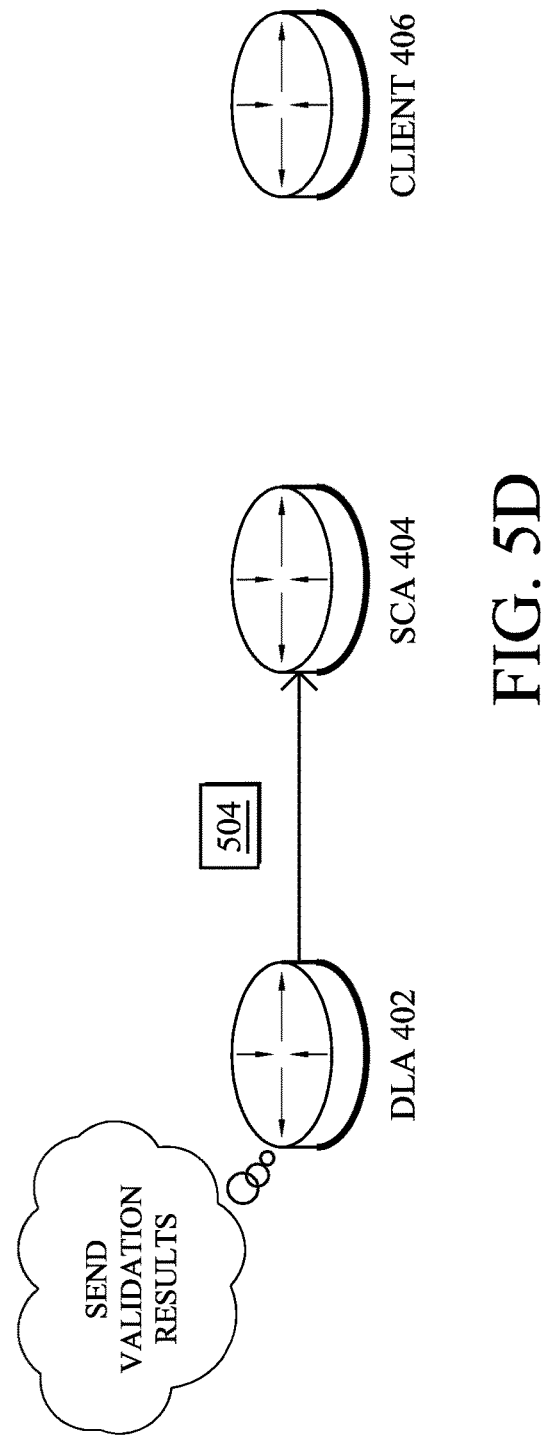

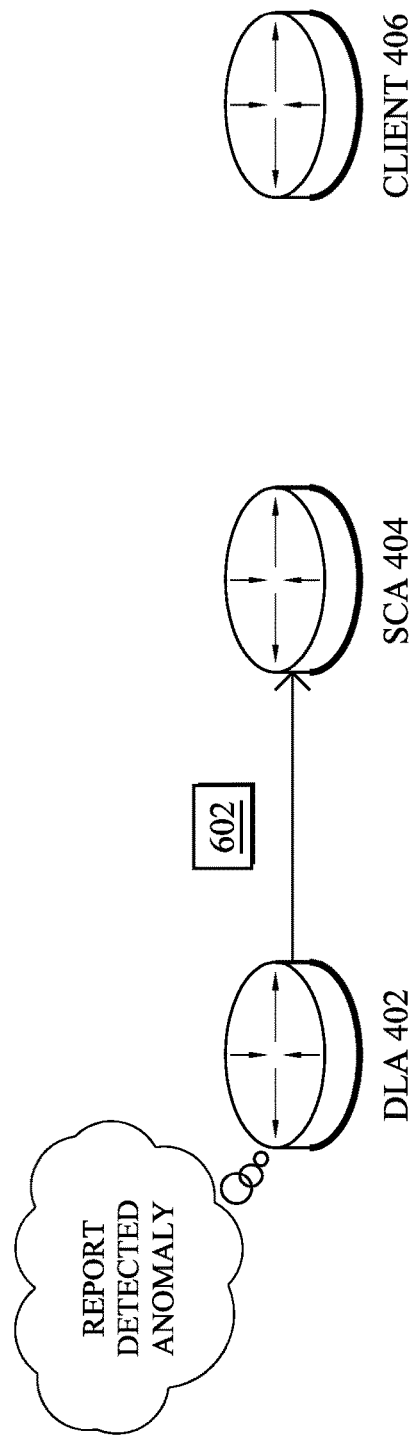
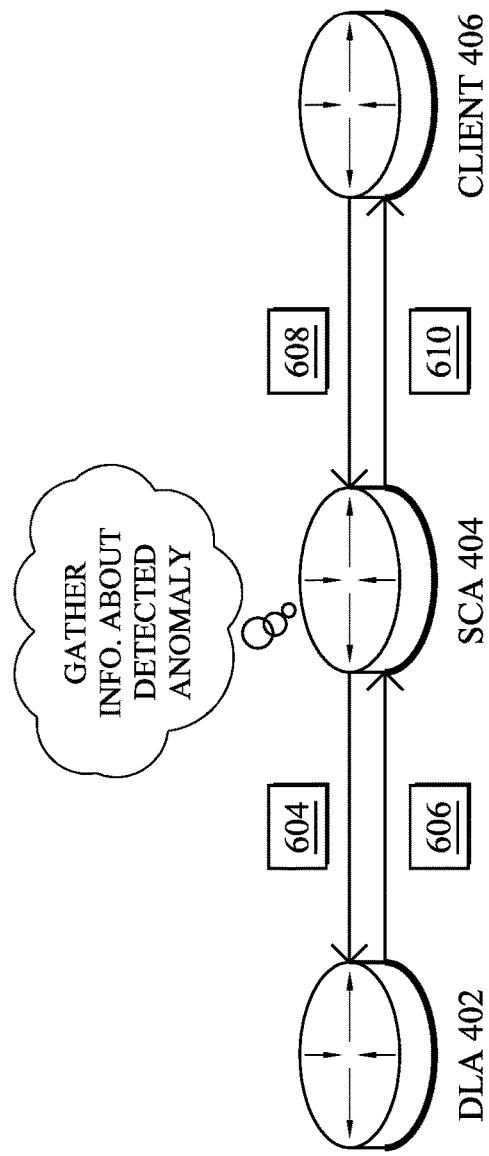
FIG. 6A
FIG. 6B

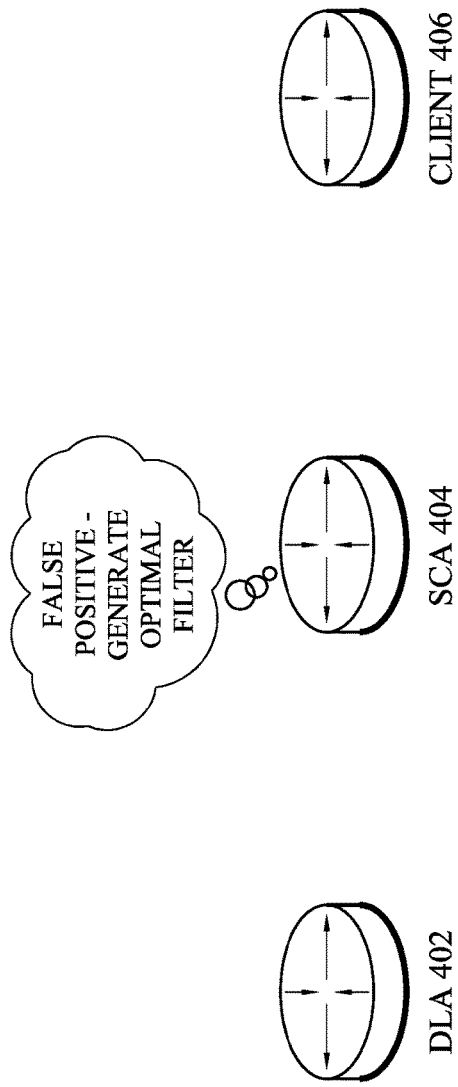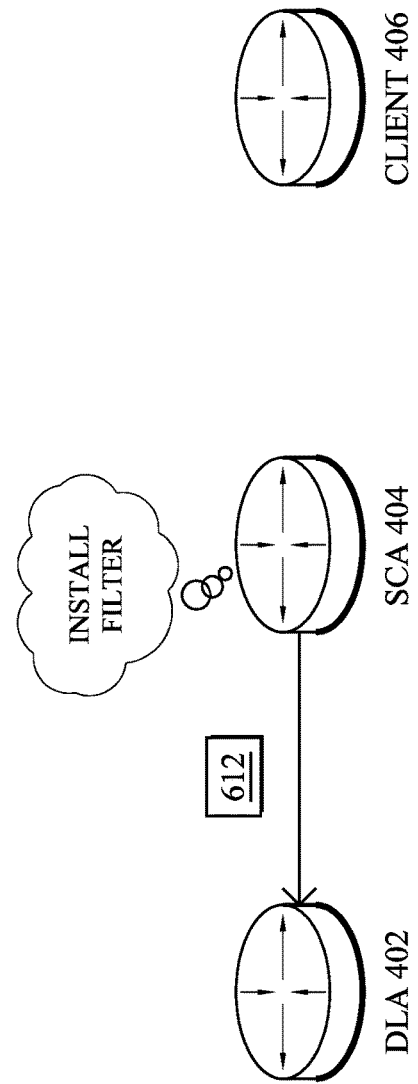

FILTERING MECHANISM TO REDUCE FALSE POSITIVES OF ML-BASED ANOMALY DETECTORS AND CLASSIFIERS

RELATED APPLICATIONS

This application claims priority to U.S. Provisional Application No. 62/106,434, filed Jan. 22, 2015, entitled "DISTRIBUTED VALIDATION OF TRAINING DATASET GENERALITY IN SELF LEARNING NETWORKS," by Di Pietro et al. and to U.S. Provisional Application No. 62/167,369, filed May 28, 2015, entitled "FILTERING MECHANISM TO REDUCE FALSE POSITIVES OF ML-BASED ANOMALY DETECTORS AND CLASSIFIERS" by Mota et al., the contents both of which are herein incorporated by reference.

TECHNICAL FIELD

The present disclosure relates generally to computer networks, and, more particularly, to a filtering mechanism to reduce false positives of machine learning (ML)-based anomaly detectors and classifiers.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5E illustrate examples of an anomaly detection model being validated;

FIGS. 6A-6D illustrate examples of an output filter being installed at an anomaly detector;

DESCRIPTION OF EXAMPLE EMBODIMENTS

Overview

Figure 1A:
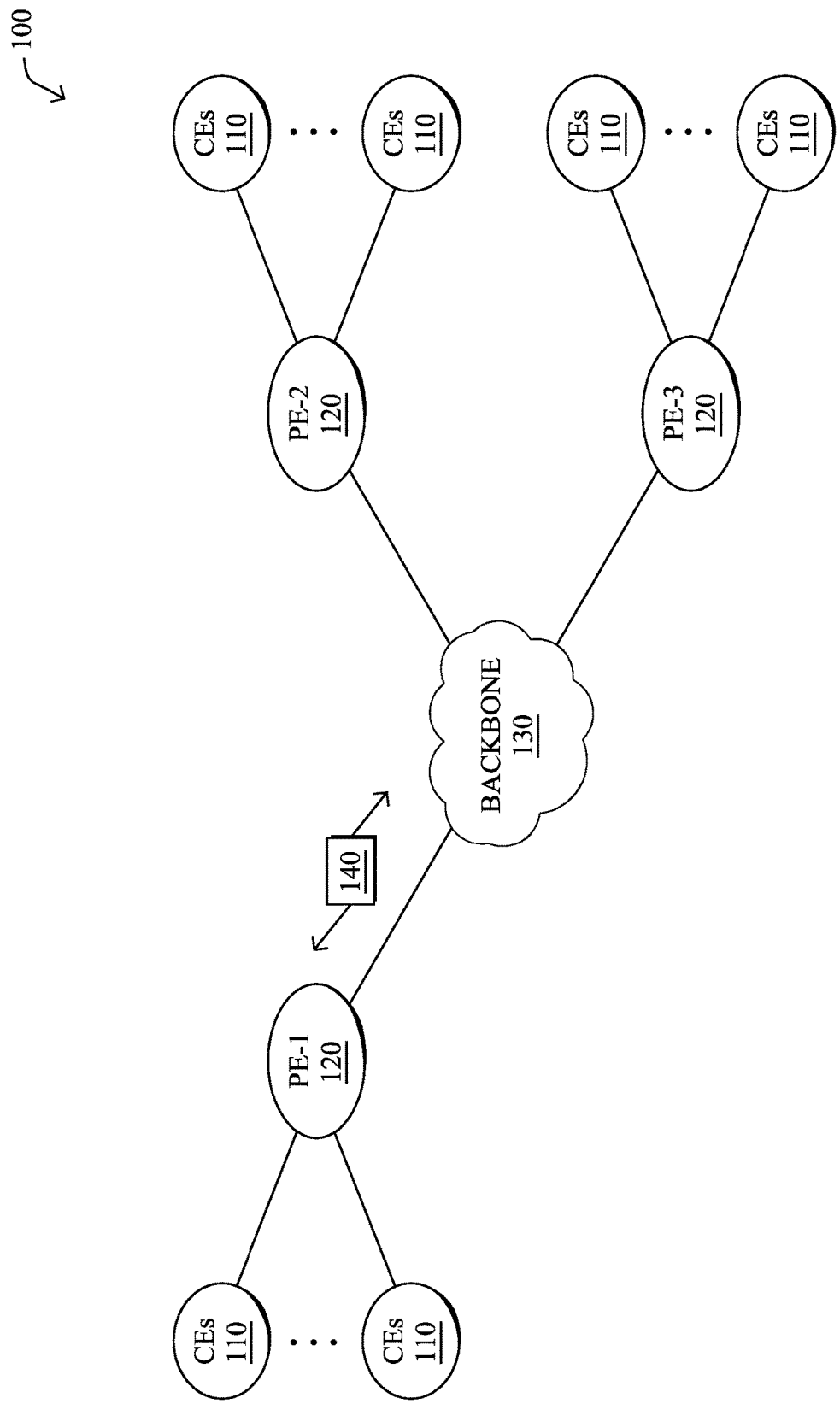
FIGS. 1A-1B illustrate an example communication network.

According to one or more embodiments of the disclosure, a device in a network receives information regarding a network anomaly detected by an anomaly detector deployed in the network. The device identifies the detected network anomaly as a false positive based on the information regarding the network anomaly. The device generates an output filter for the anomaly detector, in response to identifying the detected network anomaly as a false positive. The output filter is configured to filter an output of the anomaly detector associated with the false positive. The device causes the generated output filter to be installed at the anomaly detector.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
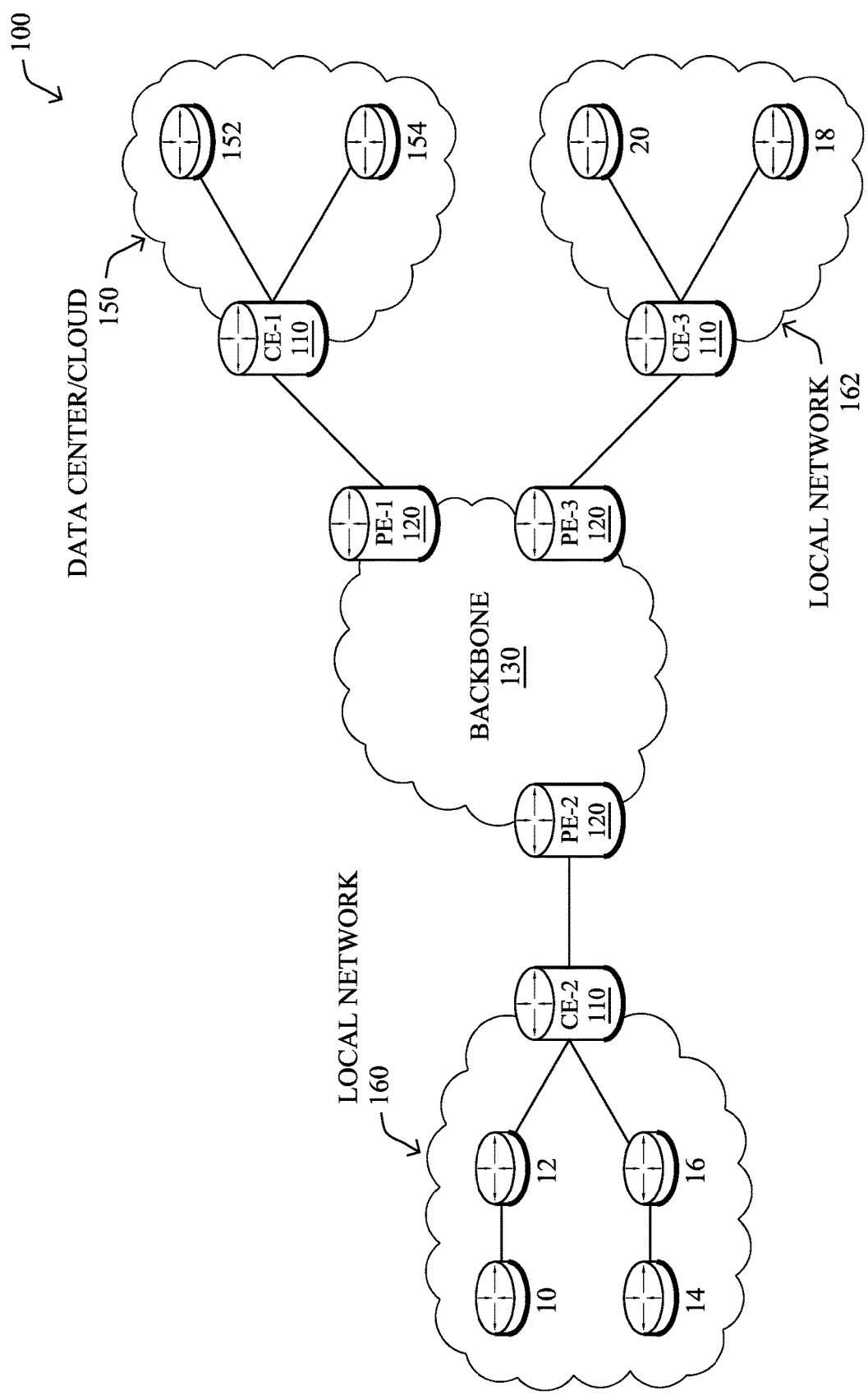

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
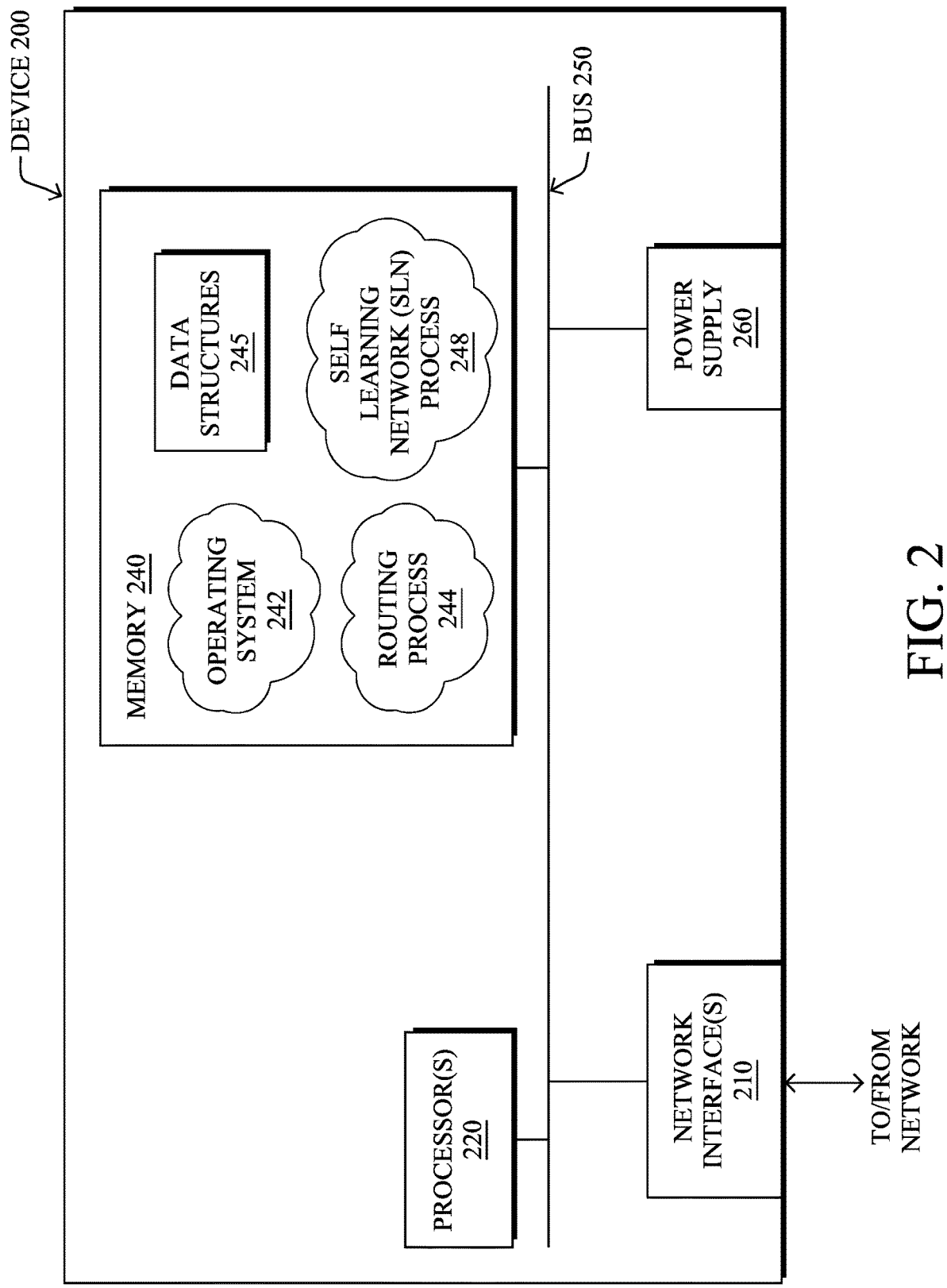
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Such anomalies may be detected using advanced machine learning algorithms(s) capable of modeling subtle changes or correlation between changes (e.g., unexpected behavior) in a highly dimensional space. Such anomalies are raised in order to detect the presence of a 0-day malware; such a malware may be used in order to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected because of their impact on traffic, host models, graph-based analysis, etc., when attempting to connect to C2 channel, move laterally, or ex-filtrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured ACL, route redistribution policy, routing policy, QoS policy maps, or the like, may have dramatic consequences such a traffic black-hole, QoS degradation, etc. Such misconfiguration may be advantageously identified by SLN process 248, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) artificial neural networks (ANNs) (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
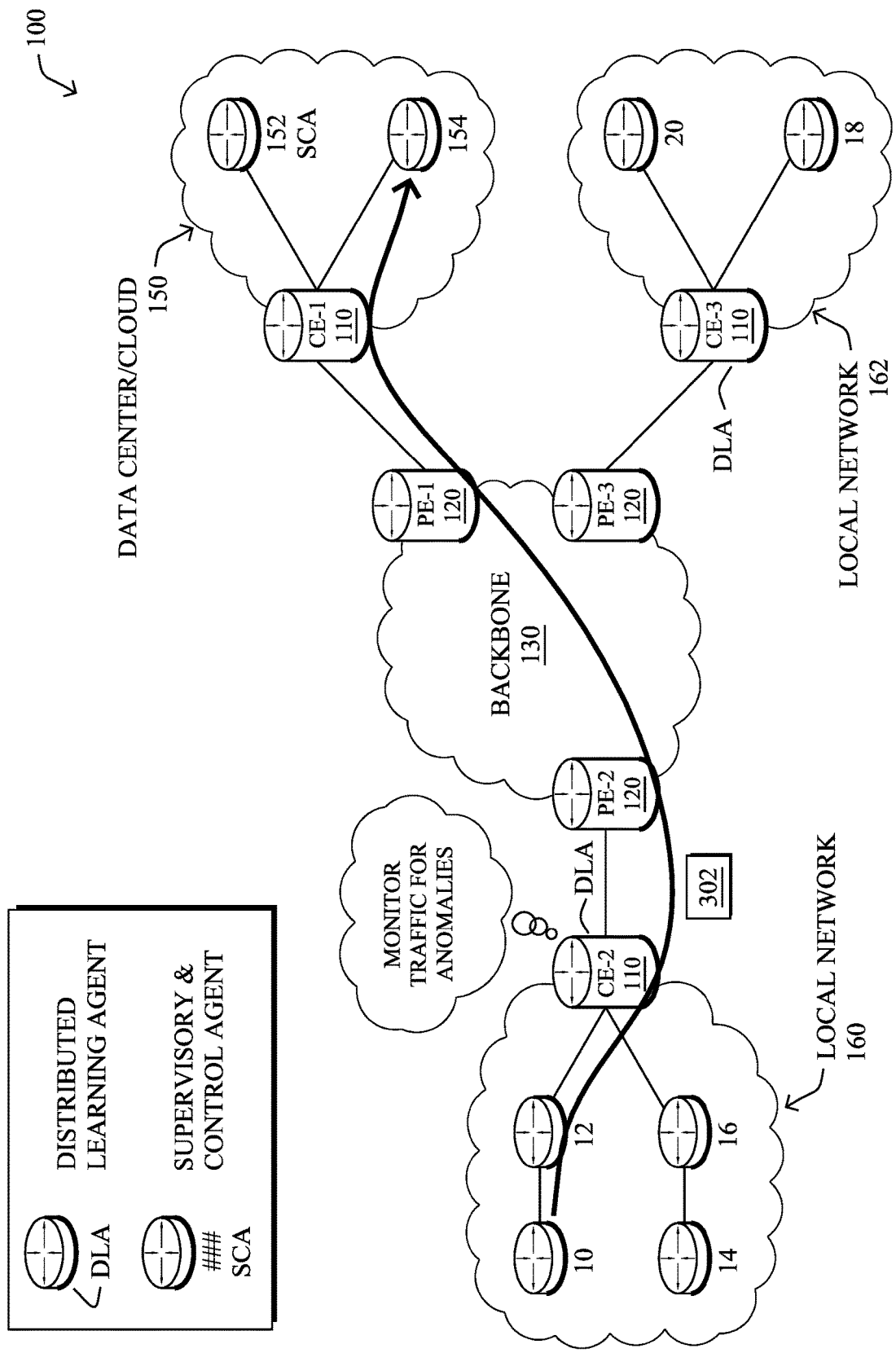
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory & control agents (SCAs). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, Internet Behavioral Analytics (IBA) may be used as part of the anomaly detection mechanisms in network 100. In general, IBA refers to the use of advanced analytics coupled with networking technologies, to detect anomalies in the network. Although described later with greater details, the ability to model the behavior of a device (networking switch/router, host, etc.) will allow for detection of the presence of a malware, which is complementary to the use of Firewall making use of static signatures. Observing behavioral changes (deviation from modeled behavior) thanks to (aggregated) flows records, deep packet inspection, etc., may allow detection of an anomaly such as an horizontal movement (e.g. propagation of a malware, etc.), or an attempt to perform information exfiltration.

As noted above, supervised machine learning (ML) techniques, such as ANNs applied to DDoS detection and classification in an SLN, have the great advantage of providing a label to the samples being classified (e.g., network traffic statistics in this case). However, these supervised techniques have the disadvantage of needing an offline training process with labeled data, i.e., data whose ground truth is known. The fact of pre-training the classifier can lead to classifiers that, when deployed in a real scenario, generate some false positives. The lack of generalization under certain situations can lead to spurious false positives. In other words, false positives may result when the input to the trained anomaly detection model is outside of the feature space used to train the model.

Various approaches may be taken to reduce the number of false positives by an anomaly detection mechanism. Generally, these approaches fall into two categories: 1.) approaches that attempt to ensure that the feature space of the training data for the detection model sufficiently covers the observable information available in the actual network, and 2.) approaches that attempt to mitigate false positives after deployment of an anomaly detection model.

With respect to ensuring that the training dataset is sufficient, a naive approach would be to create a training dataset large enough to cover the whole feature space. This approach assumes that each of the features which are used for detection will have values in a finite interval. Thus, the possible feature space would coincide with the Cartesian product of such ranges. However, since actual detection systems use potentially dozens of features, this approach would not scale well. In other words, the potential feature space may be so vast that it cannot possibly be entirely covered by the training data set. A more scalable approach to ensuring a sufficient training dataset may entail checking that the region of the feature space covered by the training set includes the region in which the feature vectors generated by relevant attacks on the network are located and throughout a large enough range of operating conditions. However, such an approach would still not be scalable enough for many implementations. Notably, collecting traffic records from a large number of vantage points in the network over a long period of time would consume a large amount of network resources (e.g., bandwidth, etc.).

Other approaches that attempt to mitigate the presence of false positives may include voting mechanisms. Under these approaches, a plurality of different machine learning (ML)-based anomaly detectors may "vote" on whether or not a detected anomaly is a true positive or false positive. In particular, the same deterministic classifier would generate the same results when applied to the same input samples, requiring the use of different types of detectors to assess the detected anomaly. However, voting mechanisms can also have a non-negligible amount of overhead on the network due to the transfer of samples to be classified, training and deployment of the different detectors, etc.

Filtering Mechanism for Reducing False Positives

The techniques herein provide mechanisms that are capable of installing filters to be applied to individual outputs of ML modules/processes loaded in DLAs (e.g., DDoS detection and classification processes, etc.). Such filters take into account the false positives that have been generated by the particular ML process/model, on one or multiple DLAs, and the expected performance (estimated during training) of the ML process/model for installation as a filter in the DLA that will be applied as a postprocessor of the outputs. During use, the filters reduce the number of undesirable spurious false positives, thereby improving the quality and the usability of the system.

In further aspects, the techniques herein provide methods for validating whether the training data set of a machine-learning (ML) based anomaly detector has been trained on a dataset that covers all of the relevant regions of the input feature space. In other words, the techniques herein ensure that, during every condition of network operation, the input features will always fall within a region which was covered by the training set. In some aspects, an ML-based model of the training dataset may be created and pushed to a number of classifiers for verification (e.g., DLAs). If the local classifiers detect that their current input features are not covered by such a model, they may raise an alarm and send their input features vectors to the entity in charge of training (e.g., an SLA). Such input vectors may then be included in the training set and the validation procedure may be started over again.

Specifically, according to one or more embodiments of the disclosure as described in detail below, a device in a network receives information regarding a network anomaly detected by an anomaly detector deployed in the network. The device identifies the detected network anomaly as a false positive based on the information regarding the network anomaly. The device generates an output filter for the anomaly detector, in response to identifying the detected network anomaly as a false positive. The output filter is configured to filter an output of the anomaly detector associated with the false positive. The device causes the generated output filter to be installed at the anomaly detector.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Figure 4:
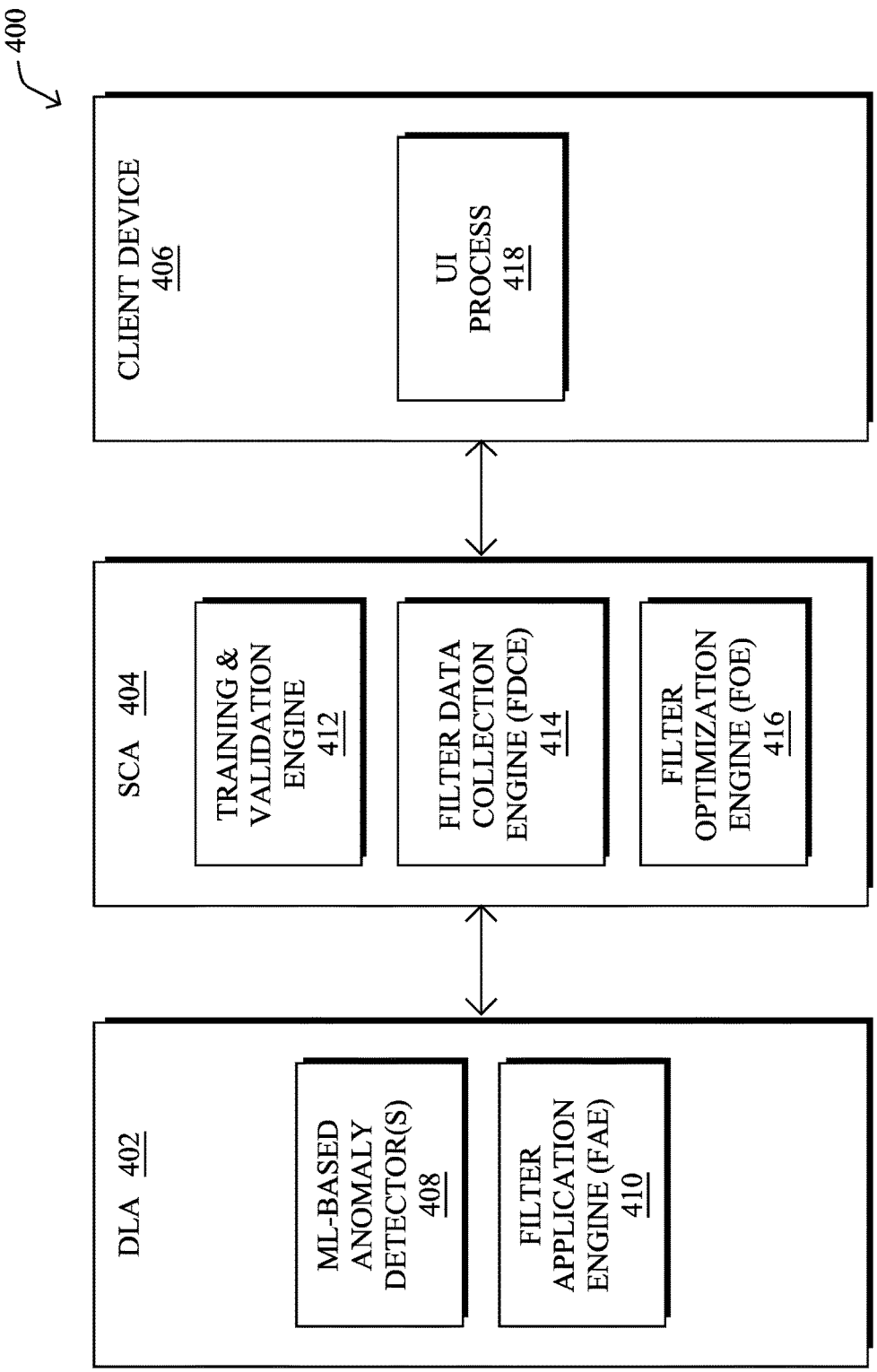
FIG. 4 illustrates an example architecture for detecting network anomalies.

Operationally, an example architecture 400 for detecting anomalies in a communication network is shown in FIG. 4. As shown, architecture 400 may include devices 402-406 such as one or more DLAs 402, one or more SCAs 404 that supervise the DLAs 402, and a client device 406 that provide a user interface with SCA 404. The devices 402-406 may execute modules/processes 408-418 as part of an SLN process (e.g., SLN process 248). As would be appreciated, processes 408-418 may be standalone applications, implemented as part of a single application, or combined in any other manner. In addition, the functionality described herein with respect to any of processes 408-418 may be optional in certain implementations.

Client device 406 may be any form of client device such as a desktop computer, laptop computer, mobile device, wearable device, etc. that executes a user interface (UI) process 418. In various embodiments, UI process 418 may communicate with SCA 404 to provide the user of client device 406 with information regarding the anomaly detecting SLN deployed in the network (e.g., via a display, etc.). Additionally, UI process 418 may be configured to allow the user to provide supervisory control over the SLN by sending control parameters and/or instructions from client device 406 to SCA 404. For example, the user of client device 406 may provide a classification a detected anomaly that either verifies that a detected anomaly is indeed a true positive or, alternatively, is a false positive. As would be appreciated, UI process 418 may be a stand-alone application or may alternatively be implemented as a web-based interface such as an interface based on the Representational State Transfer (REST) protocol or the like. In further embodiments, SCA 404 may execute UI process 418, allowing the user to interface with SCA 404 directly.

As show, DLA 402 may execute one or more ML-based anomaly detectors 408.

Generally, anomaly detector 408 may analyze information regarding the state of the network and, based on the analysis, label the information as either normal or indicative of a network anomaly. Such information may include, but is not limited to, traffic information (e.g., the applications associated with the traffic, the volume of traffic, the source and/or destination of the traffic, etc.), device information (e.g., memory consumption, processor consumption, etc.), or the like. In some cases, DLA 402 may gather this information locally. In other cases, DLA 402 may receive this information from one or more other nodes in the network.

In some embodiments, SCA 404 may execute a centralized training and validation engine 412 configured to train the anomaly detection model(s) used by anomaly detector(s) 408, to validate the suitability of the model(s), and, if necessary, to retrain the model(s). For purposes of illustration, assume that the original training dataset has been preinstalled on SCA 404 and that the originally collected dataset is large and diverse enough to cover a significant portion of the features space. In various embodiments, training and validation engine 412 may compute a "generic classifier" once and install this detection model on a large number of DLAs in the network (e.g., DLA 402, etc.) as detectors 408. As noted previously, detector 408 may monitor the traffic flowing through a particular link, compute feature vectors out of the monitored traffic, and use the feature vectors as input to its anomaly detection model (e.g., an ANN based classifier, etc.) for evaluation. Once the whole training dataset is available to training and validation engine 412, training and validation engine 412 may compute an ML-based model of such dataset.

In one embodiment, training and validation engine 412 generates an ANN-based anomaly detection model. In particular, an ANN model sometimes referred to as an autoencoder, allows using an ANN for anomaly detection. Autoencoders are essentially deep ANNs with symmetric layers with respect to a central hidden layer that contains a small number of neurons (this layer performs dimensionality reduction). These kinds of ANN structures are trained to reproduce as output the input that they receive, which means that they generate a model of their input feature space. Due to the dimensionality reduction performed by the central layer, only the input vectors located in the region of the feature space represented in the training set can be faithfully reproduced by such an ANN. Therefore, the difference between the input and the output of such an ANN, known as the reconstruction error, can be used as an indicator as to whether or not the input vector is in a well-represented region of the feature space.

In another embodiment, training and validation engine 412 may compute, for each input feature of an ANN, the ranges of its values covered by the input training set (e.g. a histogram can be used to describe dense and sparse regions, etc.). The advantage of this approach is that it is computationally less expensive than other approaches, while having a drawback that correlations among different features (which an ANN can very efficiently detect) are not represented.

In yet another embodiment, a general anomaly detection model can be used whose training baseline will be the entire training dataset. In this case, samples that are too far from the training region will be detected as anomalies. Any form of anomaly detection technique can be used for this purpose.

Training and validation engine 412 may further be configured to validate that the training set of data used to train the model of an anomaly detector 408 sufficiently covers all, or the vast majority, of the network behaviors observed by DLA 402. If not, as described in greater detail below, training and validation engine 412 may integrate the original training set with samples in regions of the feature space that were not originally covered. In turn, training and validation engine 412 may update or otherwise re-compute the detection model for use by DLA 402.

In various embodiments, a filtering mechanism may be employed in architecture 400, to mitigate the presence of false positives by the anomaly detector(s) 408. Accordingly, in some embodiments, SCA 404 may include a Filter Data Collection Engine (FDCE) 414. This allows FDCE 414 to have access to all the alarms (e.g., anomalies) sent by the DLAs, such as DLA 402, to SCA 404, without any additional cost in terms of network traffic. However, in other embodiments, FDCE 414 may be hosted on a separate device than the SCA. Generally, FDCE 414 may be configured to receive and/or collect information regarding a detected network anomaly. For example, if DLA 402 reports a detected anomaly, FDCE 414 may cause any included information regarding the anomaly to be stored and/or request any additional information regarding the detection, as needed (e.g., the specific model output of anomaly detector 408 associated with the anomaly, etc.).

A Filter Optimization Engine (FOE) 416 may also be hosted by SCA 404 or another device in communication therewith, according to various embodiments. As detailed below, FOE 416 may be configured to compute one or more optimal output filters for anomaly detector(s) 408 and to deploy a filter to any number of DLAs in the network. FOE 416 may use any of the following modes of operation, to compute an optimum filter. In the first mode of operation, FOE 416 performs filter optimizations on a regular basis, using the information about false positives that has been collected since the last filter optimization. In other words, FOE 416 may compute an output filter periodically, at scheduled times, etc. In the second mode of operation, FOE 416 performs filter optimizations only under request (e.g., in response to a request from DLA 402, client device 406, from another device in the network, etc.). Finally, in the third mode of operation, filter optimizations are automatically triggered at FOE 416 when the user of UI process 418 indicates that a detected anomaly is a false positive.

FOE 416 may compute an optimum filter for a particular ML output of anomaly detectors 408 by treating the computation as a mathematical optimization problem where the objective function to be optimized is a performance metric of the system (e.g., precision and/or recall values for the ML output) and the parameters to be optimized are the free parameters of the filter (e.g., for a temporal filtering, the window duration and the minimum percentage of positively evaluated sample inside this window). All the information required for this optimization process can be recovered from FDCE 416, which may keep historical data about any false/true positives. Note that if no true positives are in the data maintained by FDCE 414, a pre-installed validation dataset in SCA 404 (e.g., in training and validation engine 412) can be used for computing the filtering performance. In another embodiment, a pre-installed data set of traffic samples representing a particular behavior can be mixed with the live traffic information.

In one embodiment, FOE 416 computes an optimum filtering strategy using all of the false/true positives for a particular ML output coming from all of the DLAs managed by SCA 404 (and eventually a pre-installed validation set). In another embodiment, several filtering strategies may be computed simultaneously for the same ML output and deployed in different DLAs with a grace period. During the grace period, the performance of each one of these filters may be monitored by SCA 404 and under-performing filters may be removed, so that filters producing better performance may be installed.

Another aspect of the teachings herein is a Filter Application Engine (FAE) 410, in some embodiments. This component/module may be co-located with the DLAs, such as DLA 402, and function to filter outputs of anomaly detector(s) 408 according to the filtering parameters pushed by FOE 416. Note that after FAE 410 enables a filter for a particular ML output, the raw ML output (which is, in general, a continuous-valued real number) is not reported to higher layers (moderation layers or SCA 404) anymore. Instead, the output may be captured only by a filter identifier and reported as a Boolean value (e.g., detection vs. no detection) to the higher layers, based on the results of the performed filtering.

Figure 5E:
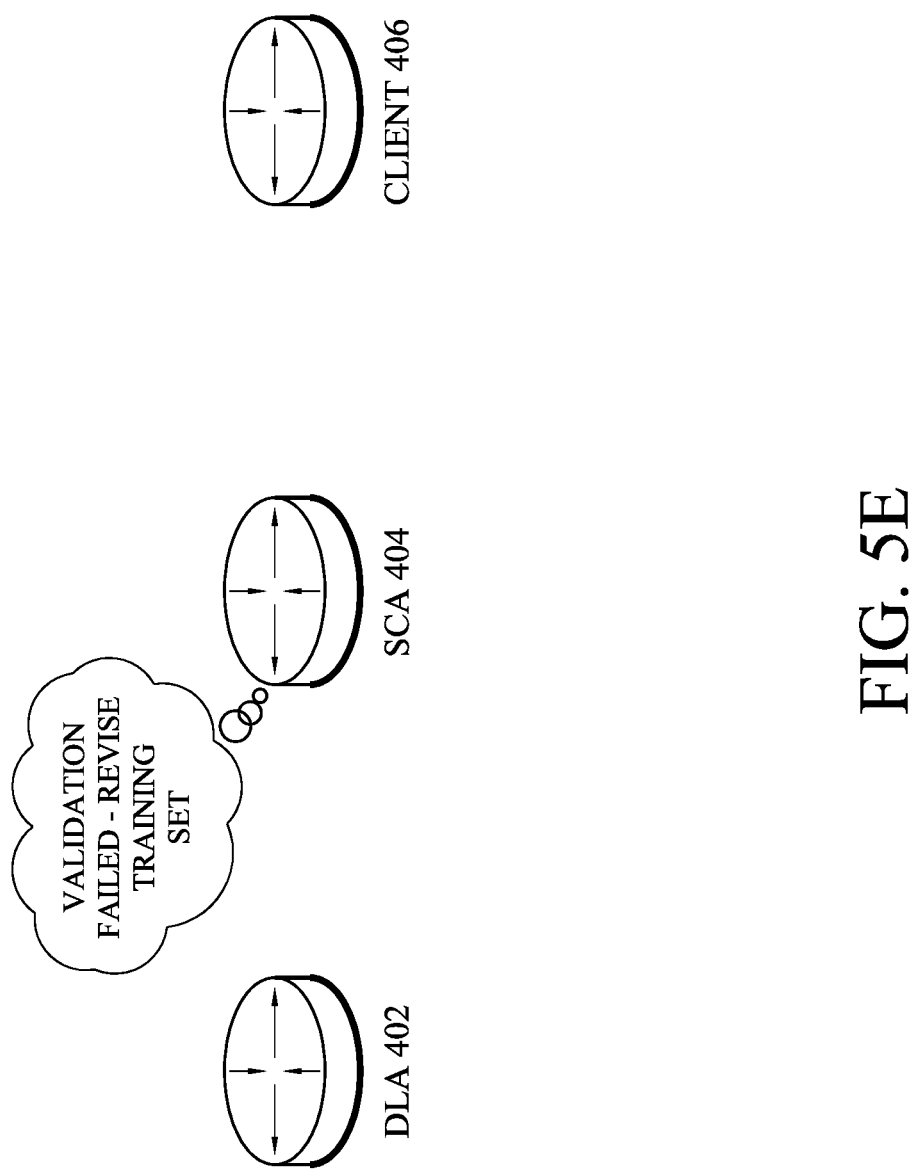

Referring now to FIGS. 5A-5E, examples are illustrated of an anomaly detection model being validated, according to various embodiments. As shown in FIG. 5A, training and validation engine 412 on SCA 404 may compute an anomaly detection model using a training dataset (e.g., gathered information regarding the operation of the network or a portion thereof). For example, SCA 404 may train an ANN-based anomaly detection model using information regarding the observed traffic flows, resource consumptions, etc. in the network.

As shown in FIG. 5B, whatever the chosen anomaly detection model, training and validation engine 412 may send a verification/validation request 502 to one or more of the DLAs, such as DLA 402. In various embodiments, request 502 may indicate any or all of the following:
The type of chosen model for the training dataset;
The model configuration parameters (e.g. the weights and topology for the ANN);
Any threshold used for making a decision about the output of the model.
The period of time during which the validation must be performed. This field may be used in case the classifier is only intended for certain times of the day (e.g. it has only been trained on overnight traffic).

In response to receiving request message 502, DLA 402 may begin computing the corresponding input feature vectors for the model based on its observed traffic. The computed input feature vectors may then be used as input for the received model. Of note is that the feature computation mechanism used by DLA 402 (e.g., by the anomaly detector using the deployed model) may be the same as that used by SCA 404 to producing the input for the anomaly classifier. In another embodiment, DLA 402 may dynamically mix samples of known attack traffic with its monitored traffic during the validation process. This allows extending the set of feature space regions that can be probed by a single detector.

As shown in FIG. 5C, DLA 402 may determine whether the trained anomaly detection model sufficiently covers the input feature vectors generated by DLA 402 using its network observations. For example, assume that the model was not trained with any information regarding HTTP traffic, but DLA 402 observes HTTP traffic. In such a case, DLA 402 may determine that the model does not sufficiently cover the observed input data.

As shown in FIG. 5D, DLA 402 may send a custom response message 504 back to the validation requestor, SCA 404. If an input vector computed by DLA 402 is not covered by the original training dataset, message 504 may be a "validation failed" message, notifying SCA 404 that the coverage of the original training set needs to be increased. In greater detail, DLA 402 may follow any number of different behaviors, in response to determining that a feature vector is not covered by the original training dataset. In a first embodiment, DLA 402 may send a validation failed message 504 to SCA 404 with no additional information included. In another embodiment, message 504 may include additional information such as the values of the feature vectors that were flagged by the model. In yet another embodiment, message 504 may include a detailed record of the traffic that has been observed on the link for which verification has failed (e.g., sampled or complete traffic flow records).

Conversely, if no feature vectors have been flagged by DLA 402 during the validation period as not conforming to the model, or if the number of such vectors stays below a configurable threshold amount, message 504 may instead be a "validation success" message sent to SCA 404. In response to receiving a validation success message, SCA 404 may proceed to compute a classifier based on its current training data set. Indeed, a successful validation proves that the current dataset is representative enough for generating a reliable classifier. The resulting model may then be pushed down to DLA 402, and to any other DLA, by SCA 404.

However, in the case of a validation failure, training and validation engine 412 may take any number of actions, depending on what kind of information was included in the validation failed message 504. If message 504 does not include any additional data, training and validation engine 412 may raise an alert to UI process 418, to request a larger training dataset from a system administrator.

As shown in FIG. 5E, if message 504 includes additional information regarding the validation failure, such as the flagged feature vectors themselves, training and validation engine 412 may add the vectors to the training set with their respective labels, and repeat the validation procedure from the beginning (e.g., model computation). The labels can be added to the training dataset using several methods. For example, if the samples are generating by locally mixing attack traces, the label is that of the specific trace used for mixing. Otherwise, the label is that of normal traffic (e.g., a locally trained anomaly detection model can be used in order to make sure that no attack is in progress during this phase). In another case, a request may be sent to client device 406 to request that a human expert manually add a label. In case the actual traffic records have been included in the message, training and validation engine 412 may mix them with traces containing traffic samples (unless that has already been done by the detector). Training and validation engine 412 may then add the associated feature vectors to the training dataset and repeat the validation procedure.

Referring now to FIGS. 6A-6D illustrate examples of an output filter being installed at an anomaly detector, according to various embodiments. As shown in FIG. 6A, if an anomaly detector on DLA 402 detects an anomaly, DLA 402 may send an alert/message 602 to SCA 404. In response, FDCE 414 may check whether this alarm has been raised by a machine learning module with output filtering capabilities. In some embodiments, such information may be conveyed via a binary flag in the anomaly message or via a centralized policy engine with information about all the ML modules used by the DLAs in the network. In turn, if output filtering is supported by the ML module, FDCE 414 may store information about the reported anomaly. Notably, in embodiments in which SCA 404 is also configured to execute FDCE 414, FDCE 414 only needs to keep a map linking each ML module output (that is compatible with filtering) with the list of anomaly IDs, for each reported anomaly. Generally speaking, an ML output refers to any output or result of an ML module/process (e.g., ML-based anomaly detector 408 hosted by DLA 402). For example, if the anomaly detector is an ANN classifier, any of the output classes of the classifier may be considered to be an output for purposes of filtering.

As shown in FIG. 6B, FDCE 414 may gather information about an anomaly detected by DLA 402, for purposes of evaluating whether a filter should be installed to DLA 402.

Since SCA 404 already maintains reported anomaly information from anomaly alerts (e.g., anomaly start time, anomaly end time, tags, DLA information, etc.), FDCE 414 can query this information locally using the anomaly ID. However, FOE 416 also needs the value of the ML output during the whole duration of the anomaly. Therefore, if a moderation layer is present between the devices, FDCE 414 may instruct DLA 402 to also upload the ML outputs during the anomaly, not only the output after moderation. Indeed, if only moderated values are uploaded from DLA 402 to SCA 404 as part of the anomaly reporting mechanism, FDCE 414 may send a Send ML Outputs (SMLO) message 604 to DLA 402. In various embodiments, SMLO message 604 may be a custom IPv4 or IPv6 message with any or all of the following type-length-values (TLVs):

OID: the ID of the output that needs to be sent. For instance, the ID identifying the output of the SLN DDoS detection and classification module that generates the tag "HTTP Slowloris attack."

TW: the time window of the outputs that have to be sent, which is the time window of the detected anomaly.

In response, DLA 402 may provide the requested information to SCA 404 via a message 606.

In one example, if the underlying ML model of one of anomaly detectors 408 on DLA 402 is compatible with filtering capabilities and raises an alarm for an HTTP Slowloris attack, FDCE 414 may store the pair {HTTP Slowloris, ID}, where ID is the id of the raised anomaly. Then, if another HTTP Slowloris attack alarm is raised later on (e.g., from DLA 402, from another DLA, etc.) FDCE 414 may expand the stored information with the new identifier, e.g., (HTTP Slowloris, ID, ID2), where ID2 is the identifier of the new anomaly. This process of storing the information about raised anomalies may be constantly performed by FDCE 414, based on a configurable parameter for the number of entries, based on an absolute number of entries (e.g., the last 1,000 anomalies, etc.), based on a time period (e.g., the anomalies raised during the last 60 minutes, etc.), or the like.

In one embodiment, another function of FDCE 414 is to capture feedback provided by a user regarding detected anomalies and the filtering mechanism. For example, SCA 404 may send a request 608 to UI process 418 on client device 406, thereby requesting the user to determine whether or not a detected anomaly is a false positive. The classification information may then be returned via message 610. As would be appreciated, if UI process 418 is executed locally at SCA 404, no additional traffic cost would result from such feedback. In another embodiment, another function of FDCE 414 may be to monitor the performance of deployed filters during a grace period, to only keep filters that have a satisfactory performance.

If a user gives feedback about a raised anomaly as being a false positive, FDCE 414 may label the corresponding entries of this anomaly ID as being optimization candidates. In turn, as shown in FIG. 6C, FOE 416 on SCA 404 may compute the optimum filter that will be applied to a certain output, as described above. For example, SCA 404 may compute one or more output filters such that the recall and/or the precision of the ML-based anomaly detector are above one or more thresholds.

As shown in FIG. 6D, once an optimum filter for a certain ML output is computed, this filter may be deployed by FOE 416 to one or more DLAs. In one embodiment, the filter is sent to a single DLA, such as DLA 402 that reported the false positive. In another embodiment, the filter is sent to the entire set of DLAs at once, using a multicast message. In yet another embodiment, FOE 416 queries a policy engine that returns the list of DLAs which can support output filtering. Subsequently, the deployment will be carried out by using a unicast or multicast message. In any of these modes of deployment, the data may be sent using a custom message called Filtering Request Message (FRM) 612, in various embodiments. FRM 612 may include any or all of the following TLVs, in various embodiments:

OID: the ID of the output that wants to be filtered. For instance, the ID identifying the output of the SLN DDoS detection and classification module that generates the tag "HTTP Slowloris attack".

FID: the ID of the filter that wants to be applied, for instance the ID of a temporal filtering, or the ID of an entropy filter.

FPS: the list of filter parameters. For instance, in the case of a temporal filtering, the duration of the window and the minimum number of positive outputs in this temporal window for effectively raise an alarm (e.g., a window of 60 seconds and a minimum of 90% of the samples labeled as Slowloris for effectively raising a Slowloris alarm). In the case of entropy filtering, the parameters would be, for example, the duration of the temporal window where entropy is computed and the maximum value of the entropy. Note that entropy is a value in the [0,1] range that tends to 0 when all the probabilities are 1.0 or all are 0.0, therefore for filtering we are interested in high probabilities in the ML output and low entropy values, since this means that the output is not constantly oscillating. Note also that if the ML output is not directly a probability, some sort of probability approximation will have to be performed by the FAE described below, for example, by computing a probability estimation in temporal sub-windows of the main filtering window.

FVP: the filter validity period, e.g., the period of time that the filter wants to be kept active, for instance 1 day, 1 week or indefinitely (in this case, if the filter wants to be removed, it will have to be disabled explicitly).

In response to receiving FRM 612, FAE 410 on DLA 402 installs the selected filter (FID) with the specified parameters (FPS) for the specified ML module output (OID) during the desired duration (FVP). In another embodiment, a grace period can be configured by FOE 416 or a policy engine and indicated in FRM 612. During the grace period, FAE 410 will anyway send alarms raised by the ML module, even if these are filtered out by the applied filter. This grace period allows monitoring the performance of the filtering strategy adopted, and re-launch a filtering optimization, if this performance is not satisfactory.

After receipt of FRM 612, FAE 410 executed by DLA 402 may perform any or all of the following operations for each new value reported ML output for which a filter has been enabled:

1. Forwarding the output to the corresponding filter instance (e.g., the FID that is applied to this output).
2. Updating metrics of FID with the new output received (e.g., the entropy value, the number of positive detections, etc.).
3. Computing the output of the filter with the updated metrics.
4. Forwarding a positive detection of OID to the higher layer (e.g., the SCA or moderation layer), if the output of the filter is positive. Note that during a grace period, output without filtering is also sent even if the filter removes the alarm.

Figure 7:
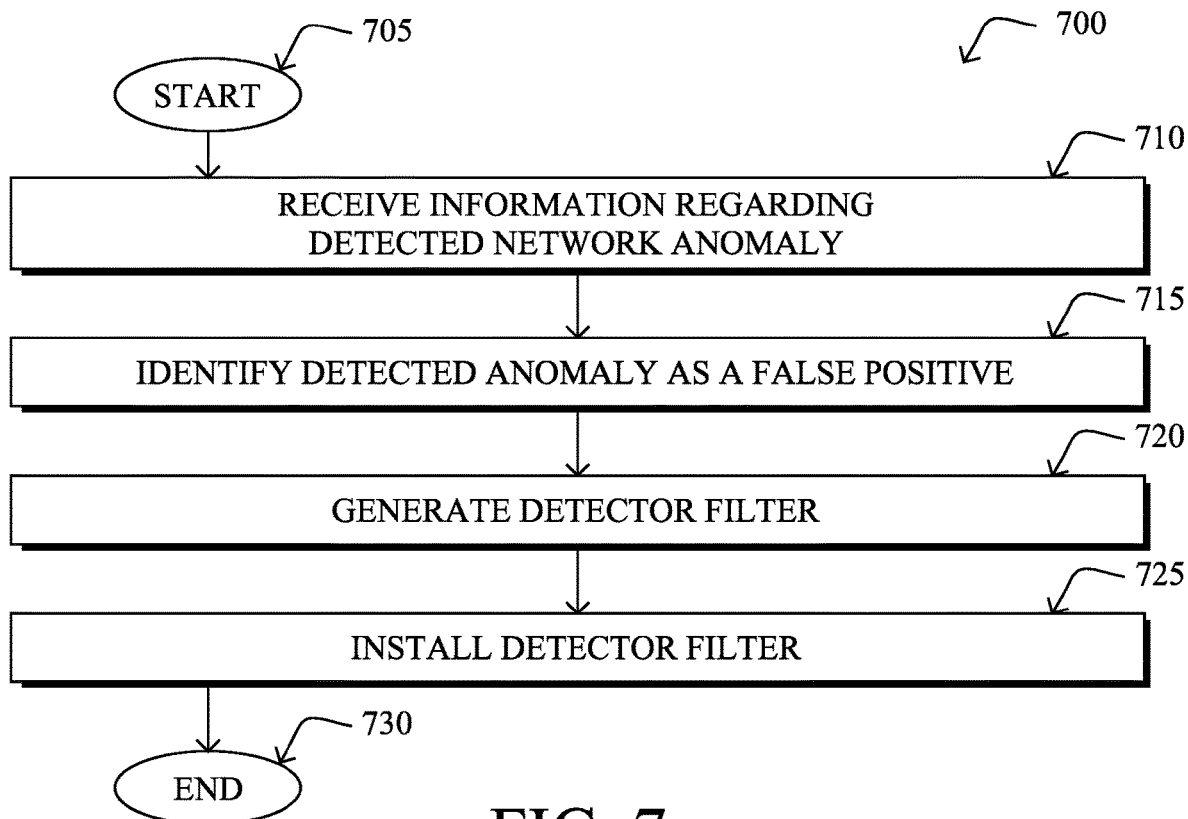
FIG. 7 illustrates an example simplified procedure for installing an output filter for an anomaly detector.

Referring now to FIG. 7, an example simplified procedure 700 is shown for installing an output filter for an anomaly detector, according to various embodiments. Procedure 700 may be performed by a device in a network by executing stored instructions, such as an SCA deployed in an anomaly detection SLN. Procedure 700 begins at step 705 and continues on to step 710 where, as described in greater detail above, the device receives information regarding a network anomaly detected by a an anomaly detector deployed in the network. For example, the device may receive an alert message from a DLA executing an ML-based anomaly detector that indicates that the DLA has detected an anomaly. In some embodiments, the device may request or otherwise gather additional information regarding the reported anomaly. For example, the device may request information regarding the specific output of the ML model associated with the detection (e.g., the specific output of the ANN-based detector, etc.) from the DLA. In another embodiment, the device may send a request to a user interface, thereby requesting that a network administrator provide additional information regarding the detected anomaly.

At step 715, as detailed above, the device may identify the detected anomaly as being a false positive. In some embodiments, the device may do so in response to receiving an assessment of the detected anomaly from a user interface. For example, a network administrator may determine that an anomaly reported by a DLA is indeed a false positive. In other embodiments, the device may automatically make this determination, e.g., by analyzing the input data using other or more powerful ML-based anomaly detection models, by analyzing which of the other DLAs in the network reported the same anomaly, etc.

At step 720, the device may generate an output filter for the anomaly detector that reported the false positive, as described in greater detail above. In general, such a filter may be configured to suppress and/or prevent the anomaly detector from reporting the corresponding anomaly. For example, the filter may be a temporal filter that requires the anomaly detector to label a certain number or percentage of samples within a given period of time as anomalous, before reporting the anomaly. In another embodiment, the filter may be an entropy filter that requires the entropy in the samples to be below a threshold, before any anomaly alerts are generated. In various embodiments, the device may generate the output filter such that the computed filter optimizes an objective function based on one or more performance metrics for the anomaly detector (e.g., in terms of precision, recall, etc.). The device may also generate the filter at any time such as a predefined time (e.g., periodically) or in response to a request (e.g., from the user interface, etc.).

At step 725, as detailed above, the device may cause the generated filter to be installed at one or more anomaly detectors deployed in the network. For example, the device may send the filter to the anomaly detector that reported the false positive. In another example, the device may send the filter to a plurality of anomaly detectors using a multicast message. For example, the device may identify any number of other detectors in the network that use the same or similar underlying model as that of the detector that reported the false positive. In turn, the device may determine that the resulting filter should also be installed at these detectors, as well. Procedure 700 then ends at step 730.

Figure 8:
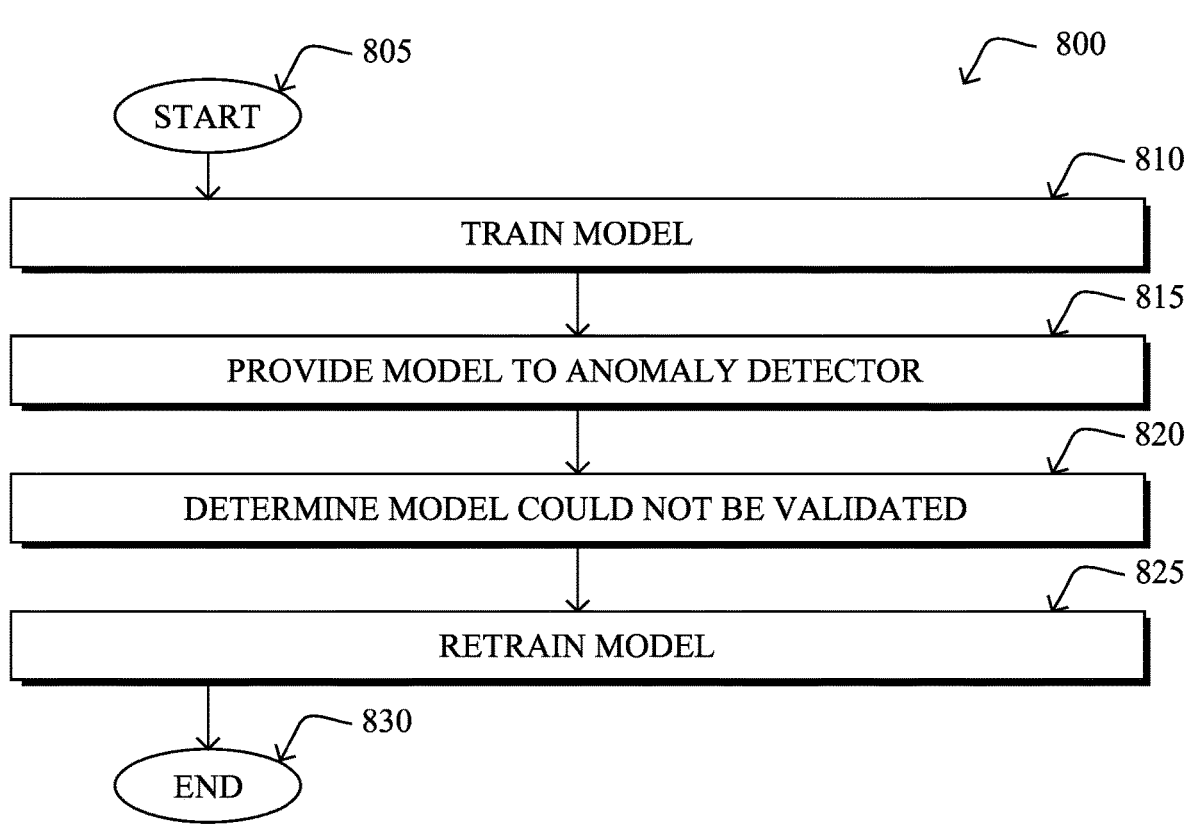
FIG. 8 illustrates an example simplified procedure for validating an anomaly detection model.

Referring now to FIG. 8, an example simplified procedure 800 is illustrated for validating an anomaly detection model. The procedure 800 begins at step 805 and continues on to step 810 where, as described in greater detail above, a device in a network may train an anomaly detection model using a training dataset. Such a training dataset may include network records, traffic records, etc., regarding the possible and/or observed states of the network. For example, the device may train an ANN-based classifier using the training dataset as input feature vectors.

At step 815, as detailed above, the device may provide information regarding the trained model to one or more anomaly detectors deployed in the network. For example, the device may send a validation request to a DLA that includes any or all of the following information: the type of the model (e.g., ANN-based, etc.), the configuration parameters of the model (e.g., the weights and topology of the ANN, etc.), threshold information used to make decisions regarding the model (e.g., how many non-matching input feature vectors before reporting that the model is not validated), a validation time period, or the like.

At step 820, the device determines that the model could not be validated based on feedback provided by the deployed devices. For example, if input feature vectors computed by a DLA are not supported by the trained model, the device may receive a validation failure message from the DLA indicating as such. In some embodiments, the failure message may also include information regarding the one or more input feature vectors that caused the DLA to determine that the model does not support the input features of the DLA.

At step 825, as detailed above, the device may retrain the model, in response to determining that the model could not be validated by the deployed anomaly detectors. In particular, the device may add any input features reported by the anomaly detectors in a validation failure message to the training dataset. In turn, the device may retrain the model, thereby covering the missing portion of the feature space. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide a lightweight and effective mechanism for reducing the number of spurious false positives of ML modules in the context of SLN. In particular, the techniques described herein introduces a mechanism that considering the expected performance of a ML module and the false positives of a particular class that it has raised, computes a filter that is pushed to the DLA(s). As would be appreciated, doing so can considerably reduce the number of future false positives without decreasing the performance, as well as improving the usability of the global system. Additionally, the traffic overhead is completely negligible for the disclosed mechanism, only requiring the description of the filter to be installed in the DLA(s) to be sent after its computation. Finally, the results of the filtering can be monitored during a certain period of time, to assure an improvement of the performance by removing the filter and/or installing a new filter, if performance is not acceptable.

While there have been shown and described illustrative embodiments that provide for the reduction of false positives by ML-based anomaly detectors and classifiers, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, information regarding a network anomaly detected by a machine learning model of an anomaly detector deployed in the network;
identifying, by the device, the detected network anomaly as a false positive based on the information regarding the network anomaly;
generating, by the device, an output filter for the machine learning model of the anomaly detector, in response to identifying the detected network anomaly as a false positive, wherein the output filter is configured to filter certain anomalies output by the machine learning model, the certain anomalies associated with the false positive;
optimizing, by the device, one or more parameters of the output filter based on the false positive such that a performance metric of the anomaly detector satisfies a threshold; and
after optimizing the one or more parameters of the output filter, causing, by the device, the optimized output filter to be installed at the anomaly detector, wherein once installed, raw outputs from the anomaly detector that are filtered by the output filter are not reported to a supervisory device,
wherein the optimizing of the one or more parameters of the output filter comprises optimizing, by the device, the one or more parameters of the output filter such that an objective function is optimized, wherein the objective function comprises at least one of: a recall or precision of the anomaly detector.

2. The method as in claim 1, wherein the output filter comprises a temporal filter that requires a threshold number or percentage of samples to be labeled by the anomaly detector as anomalous within a time window before the anomaly detector raises an alarm for the network anomaly.

3. The method as in claim 1, wherein the output filter comprises an entropy filter that requires an amount of entropy present in the output of the anomaly detector to be below a threshold amount before the anomaly detector raises an alarm for the network anomaly.

4. The method as in claim 1, wherein receiving the information regarding the detected network anomaly comprises:
sending, by the device, a request to the anomaly detector that identifies the output of the anomaly detector associated with the false positive and a time window during which the network anomaly was detected by the anomaly detector.

5. The method as in claim 1, wherein receiving the information regarding the detected network anomaly comprises:
receiving an indication that the detected network anomaly is a false positive from a user interface.

6. The method as in claim 1, further comprising:
identifying, by the device, a plurality of anomaly detectors deployed in the network that support output filtering;
sending the generated output filter to the identified plurality of anomaly detectors via a multicast message.

7. The method as in claim 1, further comprising:
training, by the device, an anomaly detection model using a training set of data regarding the network;
sending, by the device, a validation request to the anomaly detector that includes information regarding the trained anomaly detection model;
receiving, at the device, a validation response from the anomaly detector that indicates whether input feature vectors generated by the anomaly detector were included in the training set of data; and
retraining, by the device, the anomaly detection model by including the input feature vectors in the training set of data.

8. The method as in claim 1, further comprising:
specifying, by the device, a grace period to the anomaly detector, wherein the grace period specifies a period of time during which the anomaly detector is to continue providing alerts after installation of the output filter.

9. An apparatus, comprising:
one or more network interfaces to communicate with a network;
a processor coupled to the network interfaces and configured to execute one or more processes; and
a memory configured to store a process executable by the processor, the process when executed configured to:
receive information regarding a network anomaly detected by a machine learning model of an anomaly detector deployed in the network;
identify the detected network anomaly as a false positive based on the information regarding the network anomaly;
generate an output filter for the machine learning model of anomaly detector, in response to identifying the detected network anomaly as a false positive, wherein the output filter is configured to filter certain anomalies output by the machine learning model, the certain anomalies associated with the false positive;
optimize one or more parameters of the output filter based on the false positive such that a performance metric of the anomaly detector satisfies a threshold; and
after optimizing the one or more parameters of the output filter, cause the optimized output filter to be installed at the anomaly detector, wherein once installed, raw outputs from the anomaly detector that are filtered by the output filter are not reported to a supervisory device, wherein the apparatus optimizes the one or more parameters of the output filter by optimizing the one or more parameters of the output filter such that an objective function is optimized, wherein the objective function comprises at least one of: a recall or precision of the anomaly detector.

10. The apparatus as in claim 9, wherein the output filter comprises a temporal filter that requires a threshold number or percentage of samples to be labeled by the anomaly detector as anomalous within a time window before the anomaly detector raises an alarm for the network anomaly.

11. The apparatus as in claim 9, wherein the output filter comprises an entropy filter that requires an amount of entropy present in the output of the anomaly detector to be below a threshold amount before the anomaly detector raises an alarm for the network anomaly.

12. The apparatus as in claim 9, wherein the apparatus receives the information regarding the detected network anomaly by:
sending a request to the anomaly detector that identifies the output of the anomaly detector associated with the false positive and a time window during which the network anomaly was detected by the anomaly detector.

13. The apparatus as in claim 9, wherein the apparatus receives the information regarding the detected network anomaly by:
receiving an indication that the detected network anomaly is a false positive from a user interface.

14. The apparatus as in claim 9, wherein the process when executed is further configured to:
identify a plurality of anomaly detectors deployed in the network that support output filtering; and
send the generated output filter to the identified plurality of anomaly detectors via a multicast message.

15. The apparatus as in claim 9, wherein the process when executed is further configured to:
train an anomaly detection model using a training set of data regarding the network;
send a validation request to the anomaly detector that includes information regarding the trained anomaly detection model;
receive a validation response from the anomaly detector that indicates whether input feature vectors generated by the anomaly detector were included in the training set of data; and
retrain the anomaly detection model by including the input feature vectors in the training set of data.

16. The apparatus as in claim 9, wherein the process when executed is further configured to:
generate the output filter for the anomaly detector, in response to receiving a filter request from a user interface device.

17. A tangible, non-transitory, computer-readable medium storing program instructions that cause a computer to execute a process comprising:
receiving information regarding a network anomaly detected by a machine learning model of an anomaly detector deployed in the network;
identifying the detected network anomaly as a false positive based on the information regarding the network anomaly;
generating an output filter for the machine learning model of the anomaly detector, in response to identifying the detected network anomaly as a false positive, wherein the output filter is configured to filter certain anomalies output by the machine learning model, the certain anomalies associated with the false positive;
optimizing one or more parameters of the output filter based on the false positive such that a performance metric of the anomaly detector satisfies a threshold; and
after optimizing the one or more parameters of the output filter, causing the optimized output filter to be installed at the anomaly detector, wherein once installed, raw outputs from the anomaly detector that are filtered by the output filter are not reported to a supervisory device,
wherein the optimizing of the one or more parameters of the output filter comprises optimizing the one or more parameters of the output filter such that an objective function is optimized, wherein the objective function comprises at least one of: a recall or precision of the anomaly detector.

* * * * *